Sept. 22, 1959 C. G. DUENKE ET AL 2,905,891
ELECTRICAL TESTING APPARATUS
Filed March 18, 1957 10 Sheets-Sheet 4
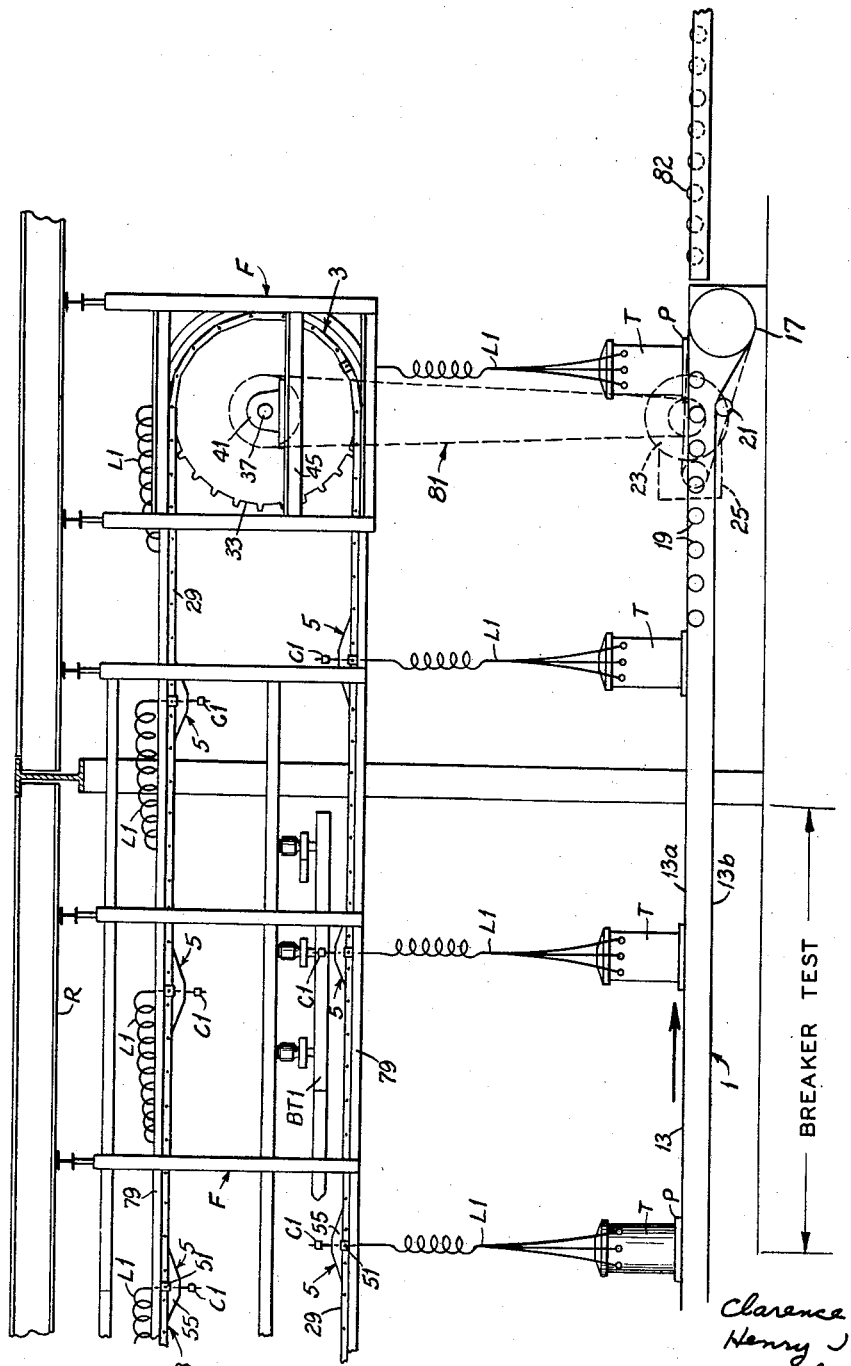
FIG. ID.

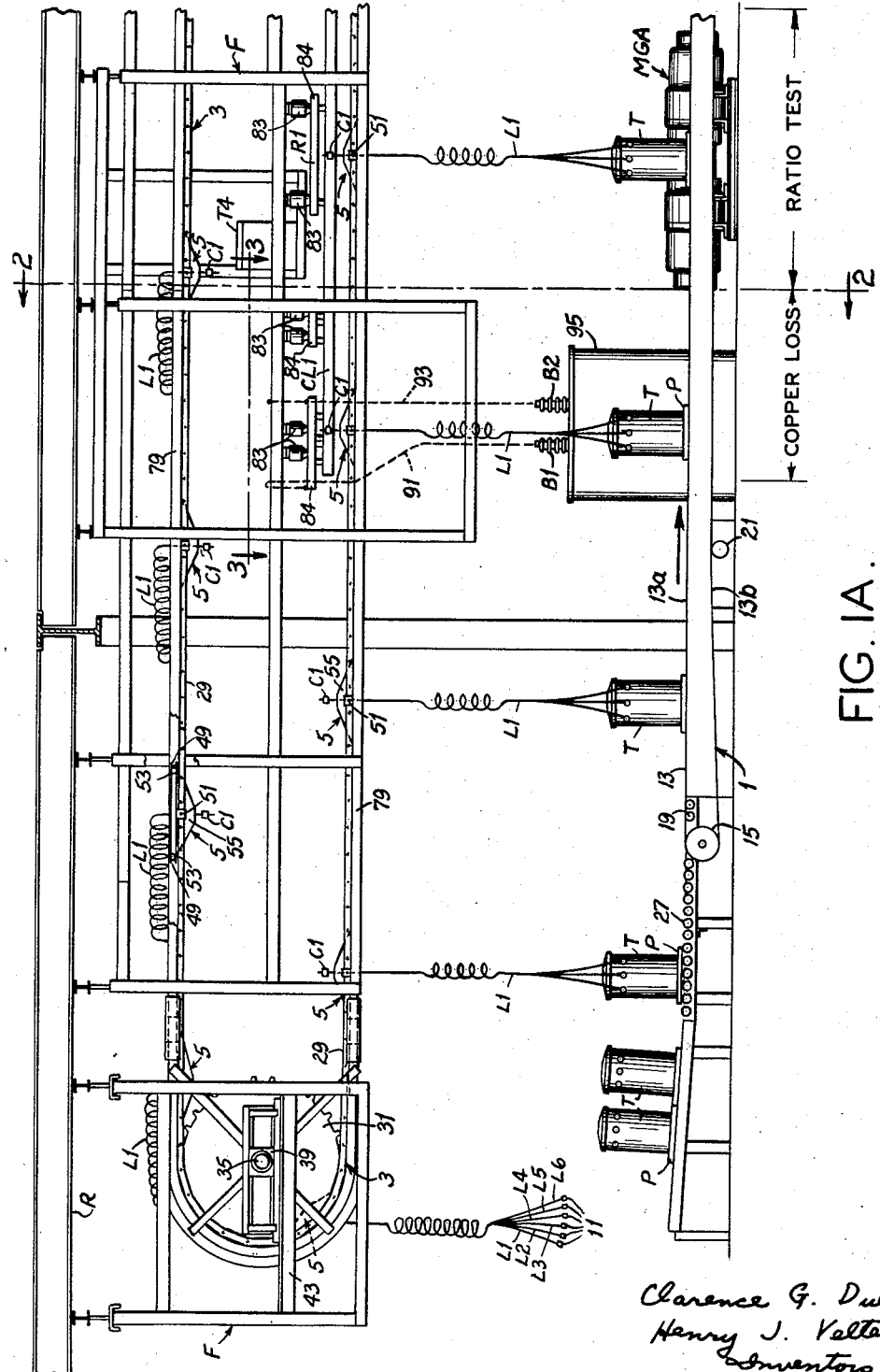
Sept. 22, 1959     C. G. DUENKE ET AL     2,905,891
ELECTRICAL TESTING APPARATUS
Filed March 18, 1957     10 Sheets-Sheet 1
FIG. IA.

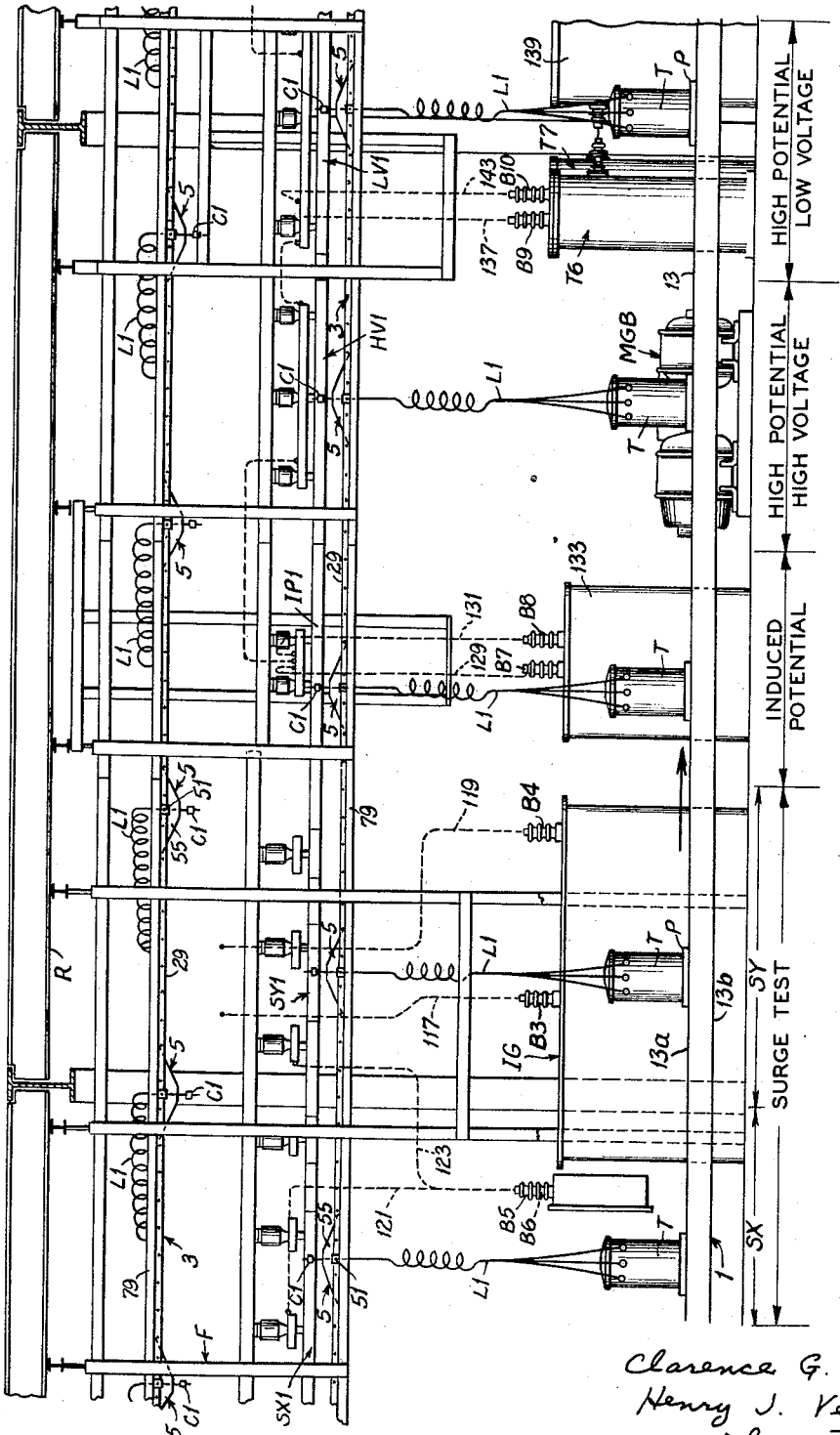
FIG. IB.

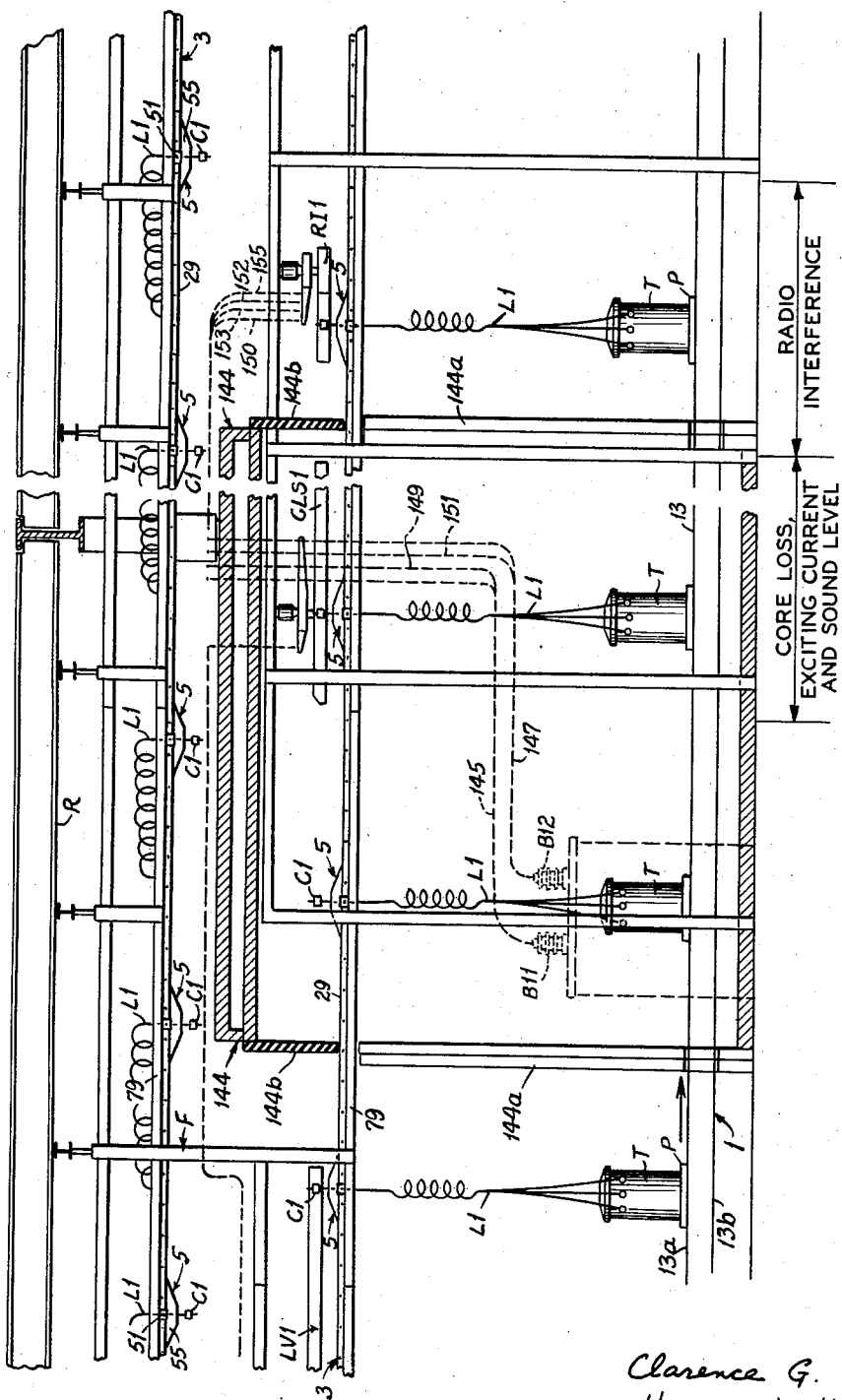

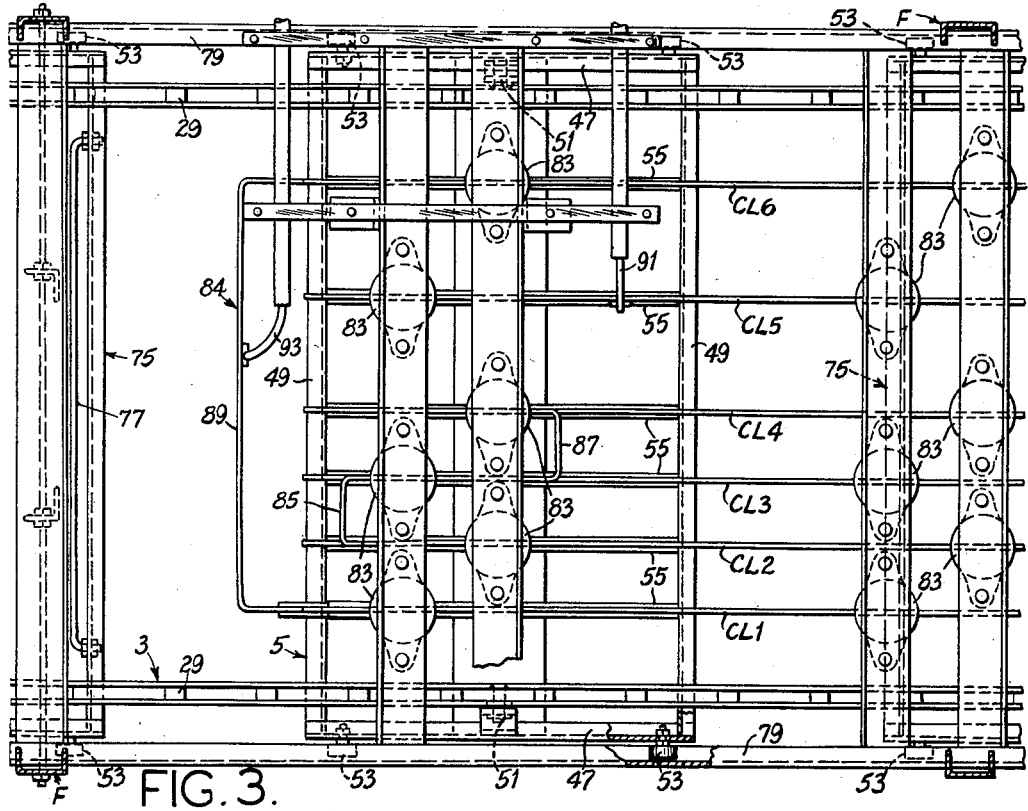
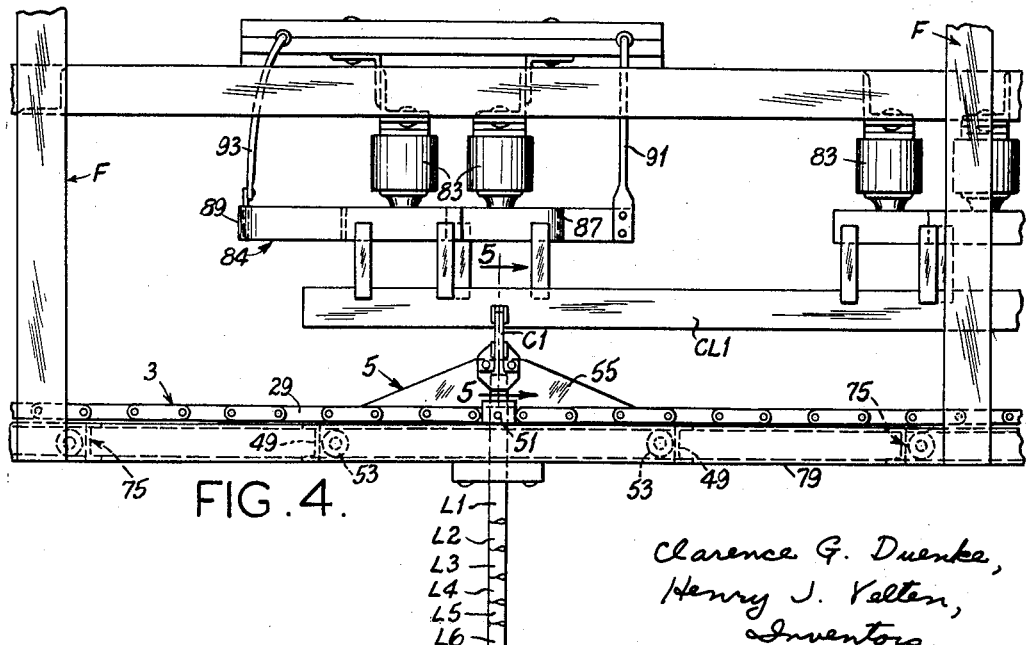

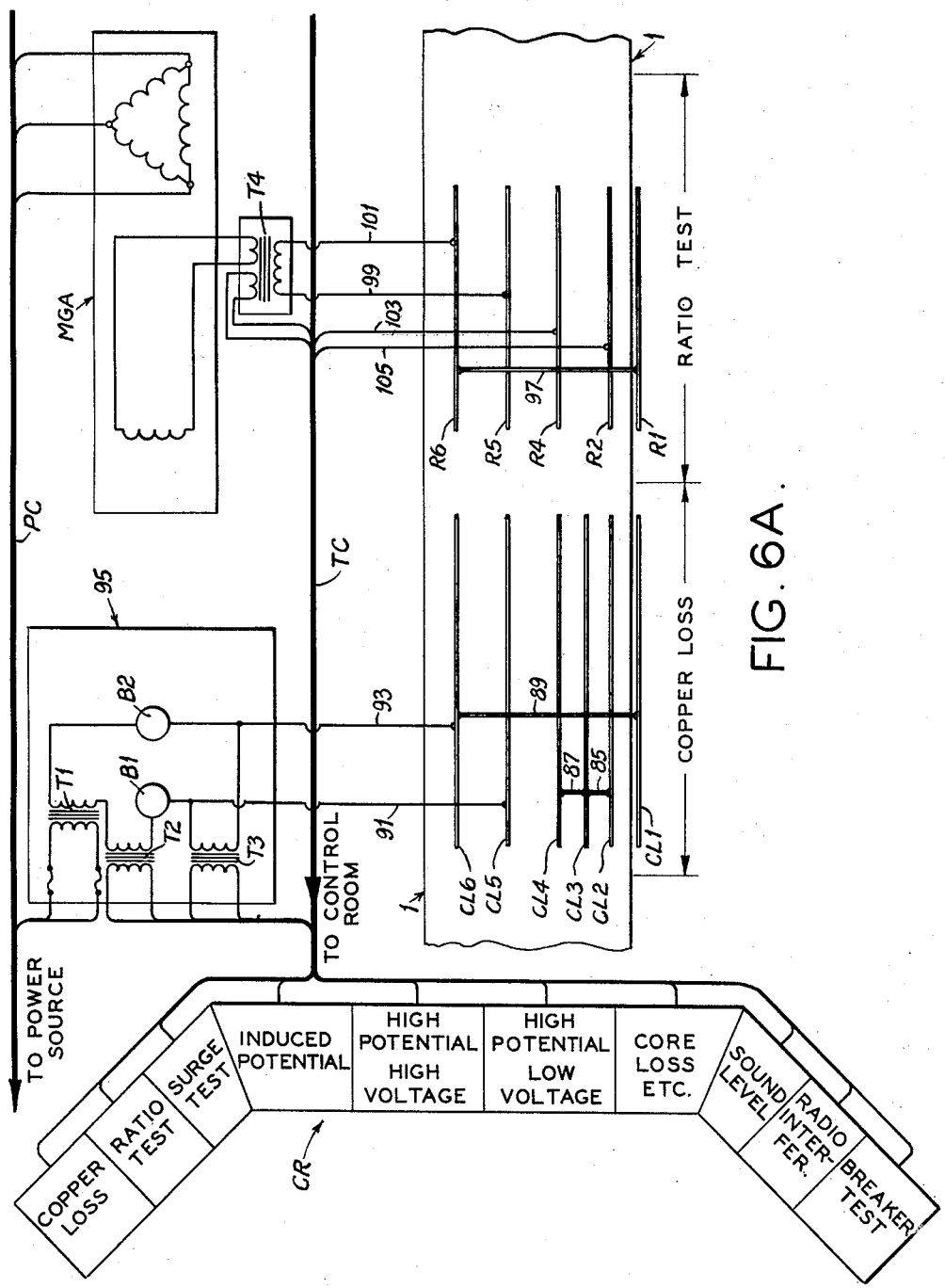

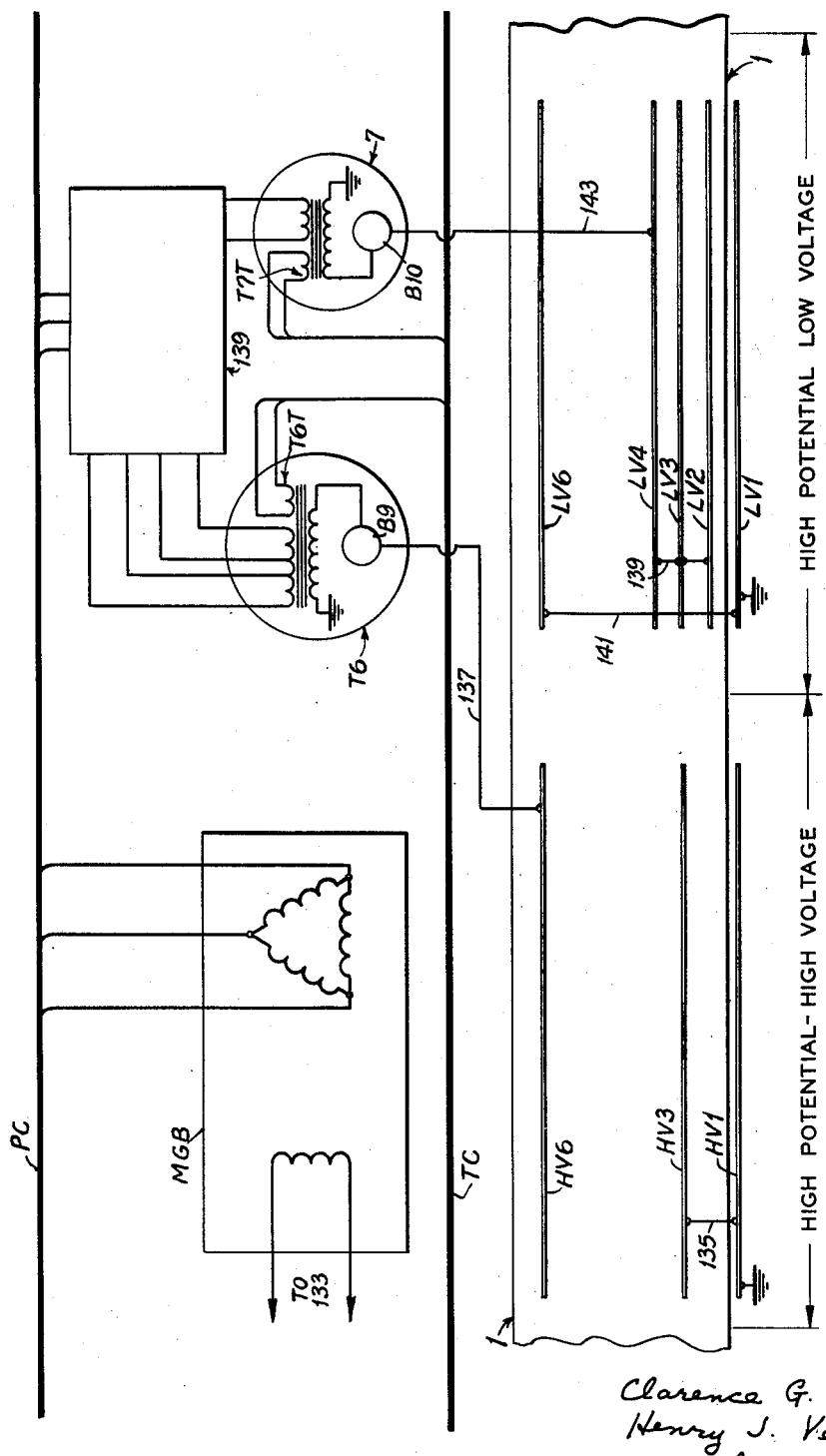

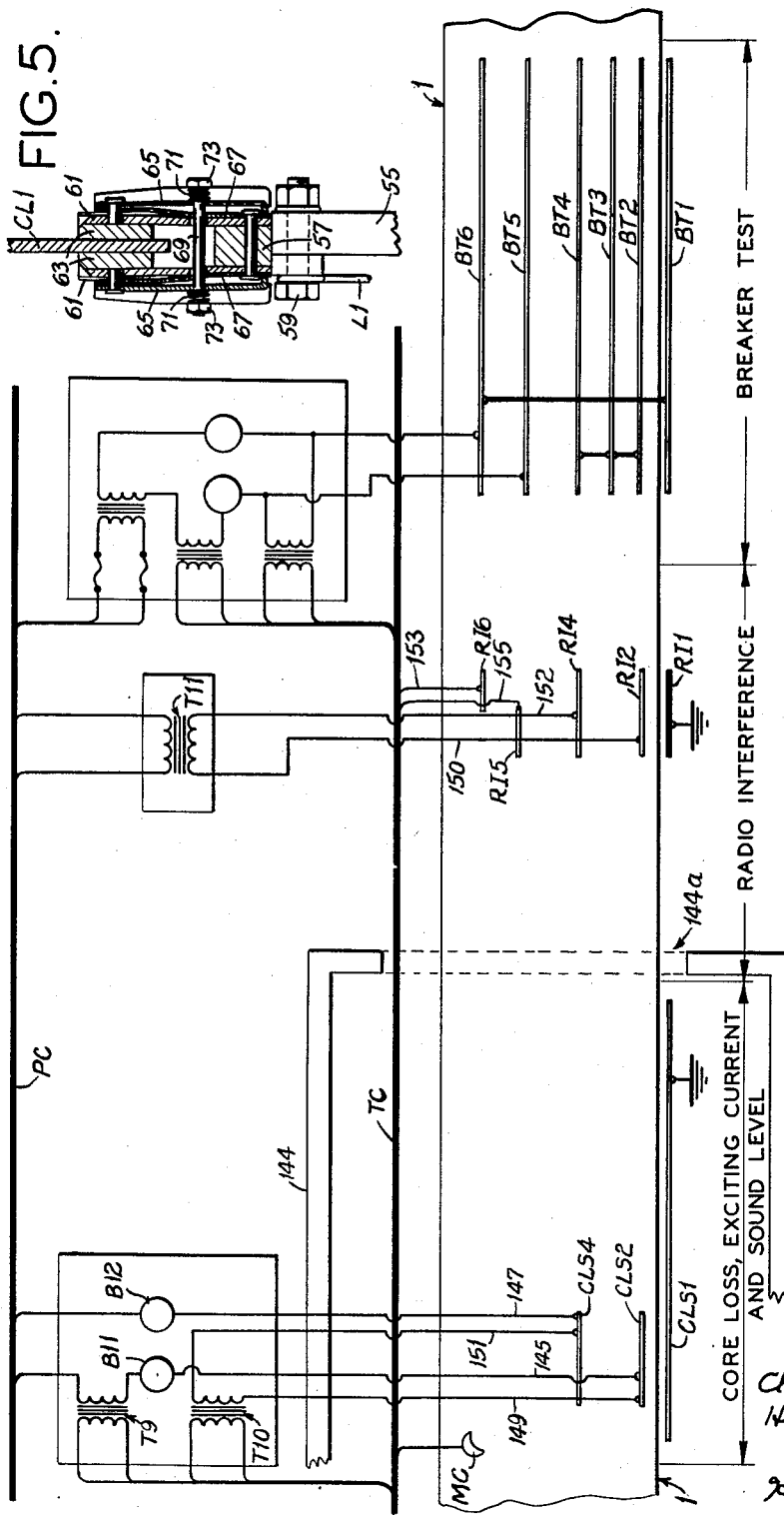

2,905,891

Patented Sept. 22, 1959

2,905,891

ELECTRICAL TESTING APPARATUS

Clarence G. Duenke, Webster Groves, and Henry J. Velten, St. Louis, Mo., assignors to Moloney Electric Company, St. Louis, Mo., a corporation of Delaware Application March 18, 1957, Serial No. 646,608

8 Claims. (Cl. 324—73)

This invention relates to electrical testing apparatus, and more particularly to apparatus for testing transformers.

In the manufacture of transformers, each completed transformer is subjected to a plurality of electrical tests to determine whether there are any faults. For example, it is desirable to test each transformer for possible faults in the brazed and other electrical connections, for faults in the windings, bushings and lead-to-ground, for faults in insulation, etc. Among the several objects of this invention may be noted the provision of apparatus for rapidly subjecting transformers which have come off a production line to various tests such as may be required, in which the transformers travel continuously through the testing apparatus and in which provision is made for automatically connecting each transformer in various test circuits as it travels; the provision of apparatus of this class which is adapted to test transformers at a maximum rate, the amount of time required per transformer for the plurality of tests being not much greater than the amount of time required for the longest single test; the provision of apparatus of a class described which is adapted to test different types and sizes of transformers; the provision of apparatus of this class in which the test results may be observed or registered at a central station; and the provision of apparatus of this class which is reliable in operation and which minimizes danger to personnel. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Figs. 1A, 1B, 1C and 1D (Sheets 1–4) are views in side elevation of an electrical testing apparatus constructed in accordance with this invention for testing transformers, Fig. 1B being a continuation of Fig. 1A, Fig. 1C being a continuation of Fig. 1B, and Fig. 1D being a continuation of Fig. 1C;

Fig. 3 (Sheet 6) is an enlarged horizontal section taken on line 3—3 of Fig. 1A;

Fig. 4 (Sheet 6) is an enlarged fragment of Fig. 1A;

Fig. 5 (Sheet 10) is an enlarged vertical transverse section taken on line 5—5 of Fig. 4; and, Figs. 6A, 6B, 6C and 6D are diagrammatic plan views of the apparatus illustrating the electrical circuitry, Fig. 6B being a continuation of Fig. 6A, Fig. 6C being a continuation of Fig. 6B, and Fig. 6D being a continuation of Fig. 6C.

Corresponding reference characters indicate corresponding parts throughout the several views of the drawings.

Figure 2:
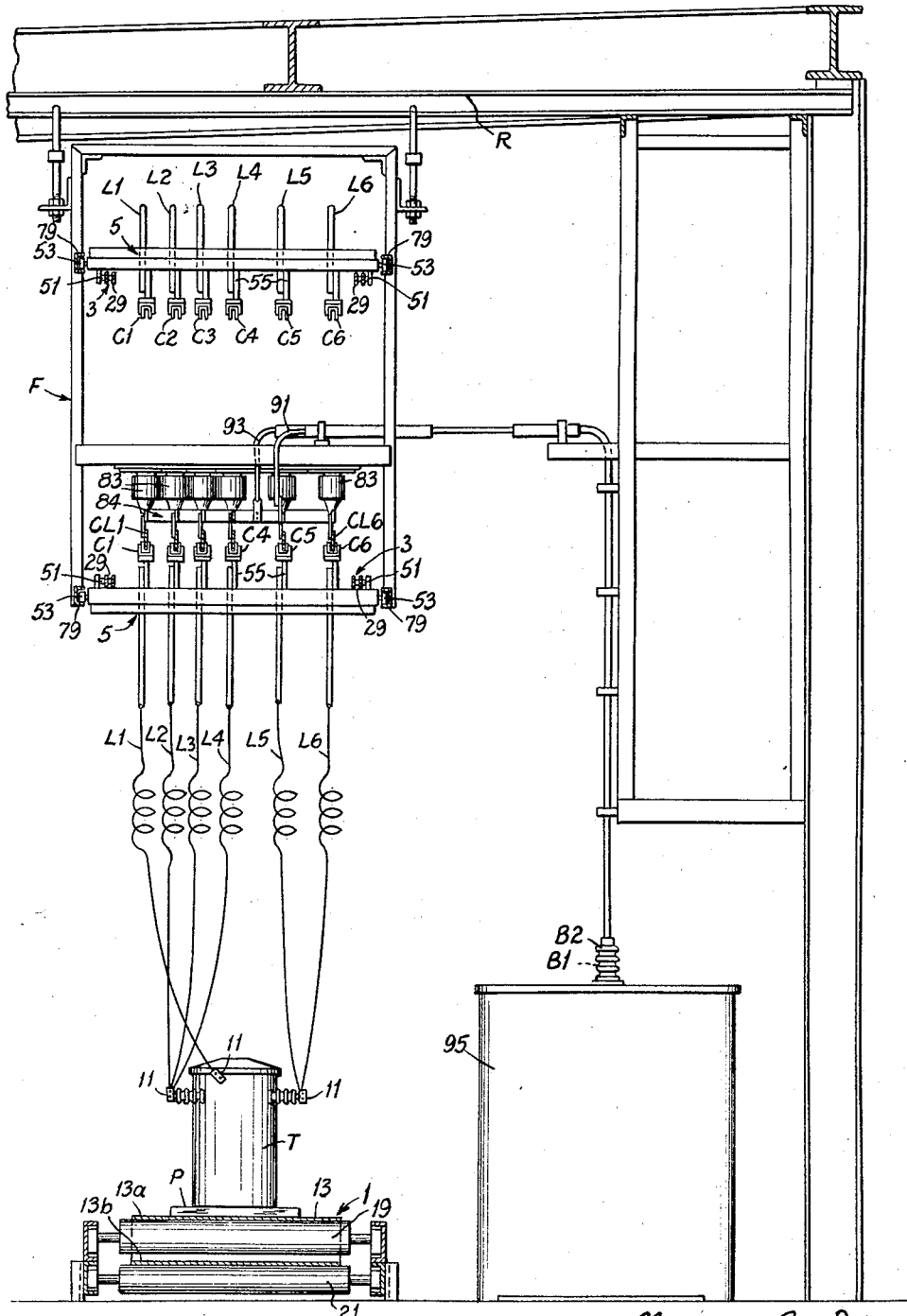
Fig. 2 (Sheet 5) is an enlarged vertical transverse section taken on line 2—2 of Fig. 1A.

Referring to Figs. 1A–1D and 2–4 of the drawings, a testing apparatus of this invention is shown basically to comprise a conveyor 1 for continuously moving a series of transformers T through a series of testing zones, and a conveyor 3 for continuously moving a series of trolleys 5 through these zones in unison with the transformers. Each of the trolleys 5 has a group of electrical collectors thereon, six of these being shown designated C1 to C6 (see Fig. 2). Attached to each collector is a flexible conductor or lead, the respective leads being designated L1 to L6. Each lead has a clamp 11 at its free end whereby it may be quickly connected to a bushing (or the tank) of a transformer T.

More particularly, the conveyor 1 comprises a long endless belt 13 trained around horizontal end rolls 15 (Fig. 1A) and 17 (Fig. 1D) to have an upper horizontal reach 13a and a lower reach 13b. The upper reach 13a is supported, intermediate the end rolls 15 and 17, by horizontal rolls such as indicated at 19. The lower reach is supported by horizontal rolls such as indicated at 21. A motor 23 (Fig. 1D) is connected to the roll 17 through a speed reduction unit 25 for continuously driving the belt 13 for travel of the upper reach 13a of the belt from left to right as viewed in Figs. 1A–1D. At the starting end of the conveyor 1 (its left end as viewed in Fig. 1A) there is provided a rollerway 27 whereby transformers T on pallets P may be rolled onto the upper reach 13a of the conveyor belt 13, to be conveyed from left to right as viewed in Figs. 1A–1D through the testing zones.

The conveyor 3, which is located directly above the conveyor 1, comprises a pair of long endless chains 29 trained around sprockets 31 (Fig. 1A) and 33 (Fig. 1D) mounted on horizontal shafts 35 and 37 journalled in bearings 39 and 41. These bearings are supported by horizontal bars 43 and 45 of an overhead frame designated in its entirety by the reference character F. This frame F may be suspended from the roof R of the building in which the apparatus is housed, as shown best in Fig. 2, or otherwise supported above the conveyor 1. The trolleys 5 extend transversely between the chains 29 and have their ends pivotally connected to the chains.

Each trolley comprises an open rectangular frame, the ends of which are designated 47 and the sides of which are designated 49 (see Fig. 3). At the centers of the ends 47 of the frame are pins 51 pivoted in the chains. Each trolley also has rollers 53 on its ends 47 adjacent each corner. The collectors C1 to C6 are mounted on plates 55 of insulation material spanning the sides 49 of the trolley frame, the plates and the collectors being spaced transversely with respect to the trolley. Each of the collectors (see Fig. 5) comprises an electrically conductive base 57 which is secured on the upper edge of its respective plate as indicated at 59. Extending up from the base 57 are two electrically conductive spring arms 61 having opposed contact tips 63 at their upper ends. Pressure plates 65 extend up from the base on the outside of the spring arms 61. Interposed between the arms 61 and the pressure plates 65 are leaf springs 67. A bolt 69 extends through the arms, leaf springs and pressure plates. Coil compression springs 71 are interposed between the pressure plates and nuts 73 threaded on the ends of the bolt.

The conveyor 3 further includes open rectangular frames 75 between the trolleys. These are identical to the trolley frames, having pins 51 pivoted in the chains and rollers 53 on their ends adjacent each corner, but do not carry any collectors. Each frame 75 has a rod 77 extending along the inside of one of its sides. The frame F carries channel-section tracks 79. The rollers 53 on the trolleys 5 and frames 75 ride in these tracks for supporting the upper and lower reaches of the chains 29. The chains are driven at the same speed as the belt 13 by means of a drive 81 taken off from the unit 25 (Fig. 1D), the direction of the drive being such that the lower reaches of the chains 29 and the trolleys 5 moving therewith travel in the same direction as the upper reach 13a of belt 13.

The belt 13 and chains 29 travel at a speed of about five feet per minute, for example. The trolleys 5 are spaced at six-foot intervals, for example. Transformers T are transferred from the rollerway to the upper reach 13a of the belt 13 so that they are spaced along the belt the same distance as the spacing of the trolleys (six feet, for example), with each transformer more or less directly under a trolley. Assuming that the transformers T are of a type having two high voltage bushings and two outer low voltage bushings and a center low voltage bushing, which requires that a connection be made to each bushing and that a connection be made to the tank of the transformer for testing, just before each transformer is pushed onto the belt 13, a workman attaches leads L1 to L6 hanging down from the appropriate trolley to the transformer as follows: L1 to the tank, L2 to one outer low voltage bushing, L3 to the center low voltage bushing, L4 to the other outer low voltage bushing, and L5 and L6 to the high voltage bushings. Then each transformer is conveyed successively and progressively through the various test zones with the leads L1 to L6 which are connected to the transformer providing for electrical connection of the transformer to the six collectors C1 to C6 of the respective trolley as follows: the tank to collector C1, the low voltage bushings to collectors C2, C3 and C4, and the high voltage bushings to collectors C5 and C6. The trolley moves along above the transformer in unison with the transformer. The connections provided by the leads L1 to L6 between a transformer and the collectors C1 to C6 on the respective trolley are maintained throughout the travel of the transformer from the starting to the terminal end of the conveyor 1. When a transformer reaches the terminal end of the conveyor 1, it is transferred to a rollerway 82, where a workman disconnects the leads from the transformer and hooks them (by means of their clamps 11) to the rod 77 on the frame 75 which is ahead of the respective trolley, so as to keep the leads from hanging down and becoming entangled as the trolley moves back toward the starting end of conveyor 3 with the upper reach of the chains 29. It will be understood that the workman at the starting end of the conveyor 1 unhooks the leads from the rods 77 on frames 75 as they come around the sprockets 31 to free them for connection to the transformers being pushed onto the belt 13.

Figure 6B:
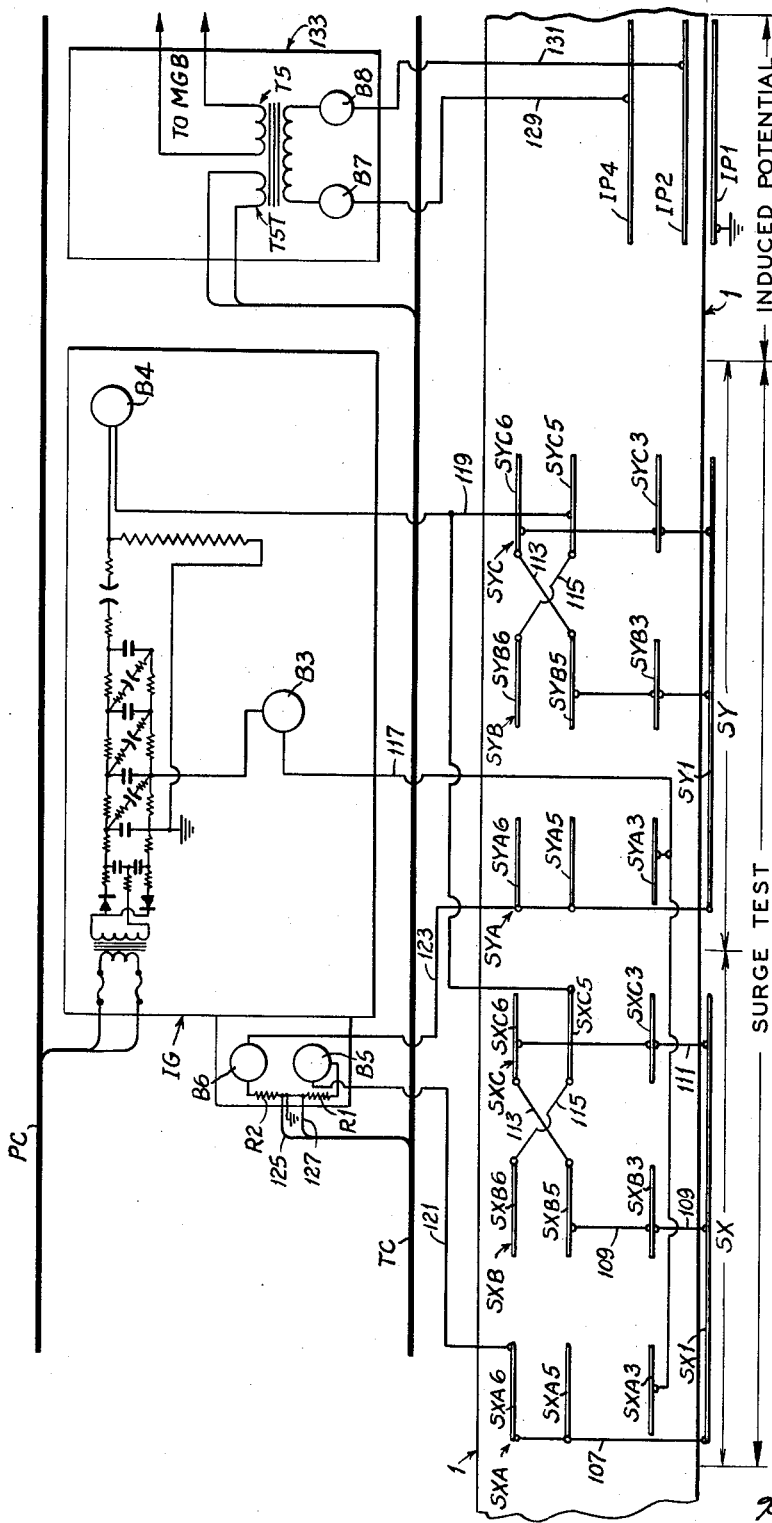

As herein shown, each transformer T being continuously moved along by the belt 13 travels through a first test zone wherein it is tested for bad brazing and other poor or loose high resistance connections. This test is referred to as the copper loss test. To make this test, the low voltage terminals of the transformer need to be short circuited and sufficient voltage applied to the high voltage winding of the transformer to cause rated current to flow. In this copper loss test zone, the frame F carries six fixed bus bars CL1 to CL6 (see Figs. 1A, 2–4 and 6A). These bars extend longitudinally with respect to conveyor 3 (in the direction of movement of the trolleys) in the horizontal plane of the collectors C1 to C6 moving with the lower reaches of chains 29. They are spaced transversely with respect to conveyor 3 at intervals corresponding to the spacing of collectors C1 to C6: Bar CL1 is in the line of travel of collector C1, bar CL2 is in the line of travel of collector C2, etc. As a trolley enters the copper loss test zone, the contact tips on the spring arms of collectors C1 to C6 come into pressure engagement with opposite sides of bus bars CL1 to CL6, respectively, and slide along these bars to establish electrical connections from the transformer to the bus bars throughout the interval during which the contact tips engage the bus bars. This interval is determined by the length of the bus bars and the speed of the trolleys.

The bus bars CL1 to CL6 are hung by means of insulators 83 and an electrically conductive framework 84 from the frame F. Bus bars CL2, CL3 and CL4 are electrically interconnected by cross bars 85 and 87 (see Figs. 3 and 6A). Bus bars CL1 and CL6 are electrically connected by a cross bar 89. With leads L1 to L6 connected to the transformer as previously explained, as the transformer travels through the copper loss test zone, the high voltage bushings of the transformer are connected to bus bars CL5 and CL6, and the three low voltage terminals of the transformer are short circuited by reason of bus bars CL2, CL3 and CL4 being interconnected by bars 85 and 87. Conductors 91 and 93 extend from bus bars CL5 and CL6 to a pair of insulated bushings B1 and B2 mounted on the top cover of a copper loss tank 95. As shown in Fig. 3, conductor 93 may be connected to cross bar 89.

The tank 95 contains a power transformer T1, a current transformer T2 and a potential transformer T3. One winding of each of the transformers T1 and T2 is series-connected across bushings B1 and B2, while one winding of potential transformer T3 is shunted across these two bushings. The other winding of transformer T1 is connected to a convenient source of A.C. power, indicated by a cable PC, while the other or output windings of transformers T2 and T3 are carried via a test signal cable TC to a control room CR, terminating at a control panel indicated "Copper Loss."

As a transformer T to be tested and its respective trolley 5 travel through the copper loss test zone, the electrical interconnections of the various buses, cross bars and conductions are such that the low voltage windings of the transformer T are shorted together and the high voltage winding of the transformer T is automatically interconnected to the bushings B1 and B2. A voltage is applied to the high voltage winding, via conductors 91 and 93, sufficient to cause rated current to flow. The potential developed across the output winding of T2, which is a function of the actual load current and the potential of the ouput winding of T3 are interconnected to instruments on the "Copper Loss" control panel in the control room and the exact amount of copper loss watts is indicated. This panel, and each of the other panels (to be described) in the control room, include an audible and visible alarm indicator which are automatically actuated when the watts loss exceeds the predetermined tolerance for the class of transformer being tested. The control room operator upon operation of the alarm will check the visual indicators and controls to determine the degree of indicated failure to meet the predetermined copper loss standard, recheck the settings of the controls to be certain they are proper for the class of transformer being tested, and then operate a reject button which prepares a paint sprayer for energization so as to spray a spot of colored paint on the casing of the rejected transformer as it moves into the next test zone. The details of the test panel (which includes controls to adjust the various components in the copper loss tank to apply the proper voltages to the class of transformer being tested and supply test signals of the desired magnitudes to the control panel), the various contactors and switches to energize the paint spray gun etc., have been omitted to avoid complexity, being readily apparent to one skilled in the art; and because any of a multitude of different circuits and controls are known which will so function.

As a transformer exists from the copper loss test zone it enters a second test zone wherein it is tested to determine if the transformer full winding voltage ratio is correct as per design and nameplate and will check for correct ratio adjuster positioning. To make this test, a nonfluctuating constant A.C. voltage is applied to the high voltage winding of the transformer, and the resultant voltage induced in the low voltage winding is indicated and automatically compared with the required voltage reading predetermined for the voltage class of the transformer with said constant voltage applied. In this so-called ratio test zone, the frame F carriers five fixed bus bars R1, R2, R4, R5 and R6 (see Fig. 6A) in line with collectors C1, C2, C4, C5 and C6. Bars R1 and R6 are electrically interconnected by a connector bar 97. Power supply conductors 99 and 101 extend to bars R5 and R6 from means adapted (via leads L5 and L6) to supply a predetermined constant A.C. voltage of the requisite value to the high voltage winding of any transformer T passing through this ratio test zone. This means includes a motor generator MGA powered from A.C. power cable PC and which supplies an A.C. voltage of desired potential to a transformer T4. This transformer has three windings, an input winding (connected to the alternator section of the motor generator), an output winding connected to the conductors 99 and 101, and a tertiary or test voltage winding connected via cable TC to a panel in the control room labeled "Ratio Test." Take-off conductors 103 and 105 are connected to bars R2 and R4, and supply a second test signal to "Ratio Test" panel in the control panel. This panel includes a voltmeter for indicating any difference between these two test signal voltages, and controls for varying taps on an instrument transformer so that the test signal voltage via conductors 103 and 105 from the low voltage winding of transformer T may be preset for the particular class of transformer being tested. Again, as in the copper loss test, indicators, alarms, reject buttons and a paint sprayer adapted to apply a spot of different colored paint to a different place on the tested transformer casing in the event of its failure of the ratio test, are provided, but the details are omitted to avoid complexity.

As a transformer exits from the ratio test zone it enters a third test zone wherein it is tested to determine if it is capable of taking switching and lightning surges in operation. This test, which is referred to as the surge or impulse test, detects winding, bushing and lead-to-ground faults, major insulation failures, division layer and turn-to-turn faults. In making this test, at least one 1½ × 40 full voltage wave of the proper value for the insulation class of the transformer being tested is applied to the center low voltage bushing and then at least one 1½ × 40 full voltage wave of the desired value for each insulation class is applied to each high voltage bushing, in sequence. Two transformers are tested simultaneously. The respective current waves are simultaneously compared by fault detecting apparatus in the control room. An oscilloscope is provided for visual examination of the waves.

The surge test zone (see Fig. 6B) may be regarded as divided into two identical sub-zones, SX and SY. Sub-zone SX comprises a long bus bar SX1 in line with collectors C1, and three sets SXA, SXB and SXC of short bus bars. The first set SXA comprises three short bars SXA3, SXA5, and SXA6 in line with collectors C3, C5 and C6. The second set SXB comprises three short bars SXB3, SXB5 and SXB6 in line with collectors C3, C5 and C6. The third set SXC comprises three short bars SXC3, SXC5 and SXC6 in line with collectors C3, C5 and C6.

Similarly, sub-zone SY comprises a long bus bar SY1 in line with collectors C1, and three sets SYA, SYB and SYC of short bus bars. The first set SYA comprises three short bars SYA3, SYA5 and SYA6 in line with collectors C3, C5 and C6. The second set SYB comprises three short bars SYB3, SYB5 and SYB6 in line with collectors C3, C5 and C6. The third set SYC comprises three short bars SYC3, SYC5 and SYC6 in line with collectors C3, C5 and C6.

Bar SX1 is interconnected to bars SXA5 and SXA6 by cross bars 107; to bars SXB3 and SXB5 by cross bars 109; and to bars SXC3 and SXC6 by a cross bar 111. To provide alternate energization of first one and then another of the high voltage bushings of transformer T, bar SXB5 is cross-connected to bar SXC6 as indicated at 113 and bar SXB6 is cross-connected to bar SXC5 as shown at 115.

The short bus bars in sub-zone SY are interconnected in an identical fashion.

The power or high voltage sources for testing the transformers in this zone are provided by an impulse generator IG comprising a rectifier and a four stage Marx generator to produce the 1½ × 40 full voltage waves. The details of this generator, shown schematically, are known to those skilled in the art. Voltage waves are provided at a first potential level (e.g., 30 kv.) at a bushing B3 and at a second and higher potential level (e.g., 120 kv.) at a bushing B4. A conductor 117 interconnects bushing B3 with bus bars SXA3 and SYA3, thus applying the 30 kv. wave to the center low voltage bushings simultaneously of each of the transformers T that move thereunder. A conductor 119 similarly interconnects bushing B4 to bars SXC5, SXB6 and SYC5 and SYB6, thereby first applying simultaneously the higher potential test voltage wave to the tested transformers high voltage bushings connected to SXB6 and SYB6, respectively, and then applying a second identical high potential test voltage wave simultaneously to the other high voltage bushings of the two transformers T as they move under the bars SXC5 and SYC5. Thus, as a pair of transformers T being tested moves from under the SXA and SYA bus bar sections, respectively, to a position under the SXB and SYB bus sections, and thereafter under SXC and SYC sections, first a test voltage wave is applied simultaneously to the low voltage windings of each of the pair of transformers T, then second and third test voltage waves are applied to each of the high voltage windings in sequence.

In order to provide the control room "Surge Test" panel with test signals which indicate the response of these transformers to the triple comparative surge test, a pair of conductors 121 and 123 is interconnected between SXA6 and a bushing B5, and SYA6 and a bushing B6. Identical resistors R1 and R2 are connected between B5 and B6 to ground, thus establishing two parallel return paths for any leakage current from the low and high voltage winding being comparatively tested in sequence. Taps are provided on these resistors to supply a pair of potentials via wires 125 and 127 and cable TC to the proper control room panel. These two potentials serve as testing or "read back" signals which are compared by an electronic comparator which indicates and actuates another alarm in the event either transformer T fails, indicating additionally which transformer failed the surge test. A third paint sprayer would thereupon be actuated after the operator presses the respective reject button to apply a spot of the proper colored paint to the casing of the transformer which failed as it passes out of this test zone.

As a transformer exits from the surge test zone it enters a fourth test zone wherein a test of the division, layer and turn-to-turn insulation is made. This test is referred to as the induced potential test. It is made by applying 346% of the rated voltage to the low voltage winding for a period of twenty seconds at 360 cycles. Any failure is indicated by an excessive voltage drop on a 360 cycle alternator which supplies the voltage.

In the induced potential test zone (see Fig. 6B), the frame carries three fixed bus bars IP1, IP2 and IP4 in line with collectors C1, C2 and C4. Power supply conductors 129 and 131 interconnect bars IP2 and IP4 to two bushings B7 and B8 of a transformer tank 133, across which an output winding of a transformer T5 is connected. The input winding of T5 is connected to the alternator section of a motor generator MCB, which supplies 360 cycle A.C. power thereto. A test signal to the "Induced Potential" panel in the control room is supplied via cable TC from a tertiary winding T5T.

With the leads L1 to L6 connected to the transformer as previously explained, as the transformer travels through the induced potential test zone, the two outside low voltage bushings of the transformer are connected to bus bars IP2 and IP4 and hence 346% of rated voltage is applied to the low voltage winding of the transformer at 360 cycles (the high voltage winding of transformer T being open during this test) for a period of twenty seconds. Any excessive voltage drop is indicated at the "Induced Potential" panel of the control room, whereupon the usual alarm system, reject button and paint spray components are actuated, if the test signal indicates the transformer has failed.

As the transformer exits from the induced potential test zone, it enters a fifth test zone wherein it is tested for winding, bushing and lead-to-ground faults and insulation between windings failure in the high voltage winding. This test is referred to as the high voltage, high potential test. To make this test, the correct voltage for the particular insulation class of the transformer is applied to the high voltage winding, with the low voltage winding short circuited to tank and grounded.

A fault will cause a voltage drop in a high potential testing transformer which supplies the high voltage winding. This voltage drop is indicated on the "High Voltage, High Potential" panel in the control room.

In the high voltage, high potential test section (see Fig. 6C), the frame carries three fixed bus bars HV1, HV3 and HV6. Bars HV1 and HV3 are electrically connected by a cross bar 135. A conductor 137 extends from a bushing B9 of a high potential testing transformer T6 to the bar HV6. Transformer T6 includes an output winding connected between ground and bushing B9, a tapped input winding connected via a contactor tank 139 to power cable PC and a tertiary winding T6T adapted to supply a test signal via cable TC to the "High Voltage, High Potential" panel in the control room.

As the transformer travels through the high voltage, high potential test zone with the leads L1 to L6 connected to the transformer as previously explained, a test voltage is applied to the high voltage winding of the transformer via conductor 137 from the high potential testing transformer T6. Any breakdown in the transformer T that would permit a substantial leakage current to flow between the high voltage winding and ground would cause a voltage drop in the output winding of T6 which in turn would be reflected as a decrease in the test signal potential of the tertiary winding T6T. This resultant voltage drop in the testing transformer is thus communicated to the "High Voltage, High Potential" control panel, where it is indicated, the alarm actuated, etc.

As the transformer exits from the high voltage, high potential test zone, it enters a sixth test zone wherein it is tested for winding, bushing and lead to ground fault and insulation between windings failure in the low voltage winding. This test is referred to as the high potential, low voltage test. To make this test, the correct voltage for the particular insulation class of the transformer is applied to the low voltage winding, with the high voltage winding short circuited to tank and ground. This test is similar to the previous test, except a high potential A.C. testing voltage is applied to the low voltage winding of transformer T rather than to the high voltage winding.

In the high potential, low voltage test zone (see Fig. 6C), the frame carries five fixed bus bars LV1, LV2, LV3, LV4 and LV6 in line with collectors C1, C2, C3, C4 and C6. Bars LV2, LV3 and LV4 are interconnected by bar 139. Bar LV6 is connected as indicated at 141 to bar LV1 which is at ground potential and to which the tank of a transformer T is connected as it passes thereunder. A conductor 143 connects a bushing B10 of a testing transformer T7 to the bar LV4.

The transformer T7 is substantially identical, except for winding ratios, to T6 and functions in the same manner to provide a lower potential testing voltage for the winding (low voltage in this instance) of the transformer T being tested as it travels through the high potential, low voltage test zone. Hence a high potential (but somewhat lower than in the previous test) is applied to the low voltage winding of the transformer from testing transformer T7. If there is any leakage across to the high voltage winding, there is a voltage drop in the tertiary winding T7T of T7. This voltage drop is communicated as a decreased test signal to the "High Potential, Low Voltage" panel in the control room, whereupon the actions and indications similar to that described above in relation to the previous test zones take place if any transformer T fails this test.

As a transformer exits from the low voltage high potential test zone, it enters a tunnel 144 (see Figs. 1C and 6D) which is soundproofed to keep out extraneous noise. At each end of the tunnel there are sliding doors 144a which are opened for ingress and egress of the transformer, and which are closed as soon as a transformer has entered and a transformer has exited from the tunnel. Suitable equipment (not shown) may be provided for automatically opening and closing these doors at the proper time. Curtains 144b are provided at the ends of the tunnel for permitting ingress and egress of the trolleys.

As a transformer T moves through the tunnel it travels through a seventh test zone wherein it is tested to determine if the no-load losses meet predetermined standards for its voltage and KVA class. This test is referred to as the core loss and exciting current test. At the same time the transformer is tested to determine its sound level in decibels. In this core loss and exciting current and sound level test zone, the frame carries three fixed bus bars CLS1, CLS2 and CLS4 in line with collectors C1, C2 and C4. Connections are made as indicated at 145 and 147 from bus bars CLS2 and CLS4 to a pair of bushings B11 and B12. These bushings are connected across a 240 v. A.C. 60 cycle main, one side of which has the primary winding of a current transformer T9 connected in series therewith. Another pair of conductors 149 and 151 interconnect CLS2 and CLS4 to a potential transformer T10. The secondary of T9 and the output winding of T10 each provide a test signal which is a function of applied current and potential, respectively, via cable TC to the "Core Loss, etc." test panel in the control room.

As a transformer T travels through the tunnel, a 240 v. A.C. 60 cycle testing potential is automatically applied to its two outside low voltage bushings by means of bus bars CLS2 and CLS4. The test signals actuate instrumentation at the control panel to indicate and record core loss watts and exciting current, and if these values are outside the established tolerance levels appropriate steps, as described above in relation to the preceding tests, are automatically taken to so mark the transformer casing.

Substantially concurrently with the core loss test a microphone MC picks up the audible sound produced by the transformer T under full excitation. Connections are made from the microphone MC via cable TC to a "Sound Level" test panel in the control room which includes a decibel meter, and appropriate steps are taken if the noise level exceeds tolerances.

Just after the transformer leaves the tunnel, it enters the eighth test zone wherein it is tested to determine if the transformer corona level is within limits. In this test a transformer T11 supplies a predetermined A.C. testing potential to the low voltage winding of a transformer T via conductors 150 and 152 and two short bus sections R12 and R14, which are in line with collectors C2 and C4 and a ground connection from R11 in line with collectors C1. The resultant output potentials from each of the high voltage bushings of transformer T are sequentially picked off from collectors C5 and C6 and transferred by means of bus bars R15 and R16, two wires 153 and 155, and test cable TC to the "Radio Interference" panel in the control room. The corona level in millivolts at a frequency of approximately one megacycle is indicated and recorded, and the usual marking of the case again takes place if outside of tolerance limits.

The last test is made on the moving transformer T in the zone indicated as "Breaker Test Zone" wherein any internal protective circuit breakers are automatically checked to determine if they open within the correct time period at the desired degree of over-load for each voltage and kva. class of transformer. The bus circuitry and equipment to supply the testing potentials is identical to that described in the first or copper loss test zone. Thus, bus sections BT1 to BT6 correspond in alignment and are cross connected as are bus sections CL1 to CL6, respectively. The only difference in these two test zones is that the voltage which is applied to the high voltage winding in this breaker zone is increased to the extent that several times rated current is caused to flow in the shorted low voltage winding, instead of merely causing rated current to flow as in the copper loss test.

It is to be understood that microswitches, tripping levers, etc., are preferably associated with the apparatus of the present invention whereby the approach, entry into and exiting from a test zone of each transformer T actuate the testing circuits in such a manner that the bus sections are not energized or deenergized when the trolley collectors are out of contact with the bus sections. Also, it is preferred that proper switching and interlock arrangements be provided so that the control room operator is automatically alerted when a run of one class of transformer is completed and a new class begins its travel along the conveyor. The details of such devices are not essential to the understanding of the invention and are easily provided by one skilled in this art.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:
1. Apparatus for testing transformers of different types and sizes having various arrangements of bushings and terminals, said apparatus comprising a lower endless conveyor having a horizontal upper reach adapted continuously to convey a plurality of said transformers through a series of testing zones, an upper endless conveyor having a horizontal lower reach located above and movable in the same direction as and in unison with the upper reach of the lower conveyor, a series of trolleys carried by the upper conveyor, a set of collectors on each trolley, flexible leads adapted to hang down from the collectors on each trolley and adapted to be electrically connected to one of said transformers, and a set of fixed bus bars in each of said zones connected in a testing circuit and extending in the direction of movement of the trolleys for engagement by various ones of the collectors on each trolley as the trolley travels through the respective zone.

2. Apparatus for testing transformers of different types and sizes having various arrangements of bushings and terminals, said apparatus comprising a conveyor for supporting a series of transformers in spaced relation and movable to convey the transformers progressively one after another through a series of testing zones, means for moving a series of trolleys through said zones in unison with said transformers, a set of collectors on each trolley, flexible leads extending from the collectors on each trolley adapted for quick attachment to said various bushings and terminals, and a set of fixed conductors in each of said zones connected in a testing circuit and adapted for engagement by various ones of the collectors on each trolley while it is within the respective zone, said fixed sets of conductors in each testing zone being positioned and electrically interconnected so as to apply in sequence various testing voltages to the leads connected to each transformer while it is within said zones and to provide a series of test signals from each transformer which determine the electrical properties of each transformer under the predetermined test conditions to which it is subjected in the various test zones.

3. Apparatus as set forth in claim 2 which further includes a control room having a number of panels each corresponding to the various testing zones, and means for transmitting said test signals from the various testing zones to the corresponding panels whereby the test signals are indicated and registered.

4. Apparatus as set forth in claim 2 in which each of said transformers includes a plurality of windings which are thereby independently and jointly subjected sequentially to various test conditions to determine their electrical properties.

5. Apparatus as set forth in claim 2 in which the fixed conductors in one of said zones are positioned and electrically interconnected so as to apply a single testing voltage to each of a pair of transformers simultaneously and to provide independent test signals from each of the transformers which indicate the ability of each of said transformers to withstand respectively the applied testing voltage.

6. Apparatus as set forth in claim 5 in which the fixed conductors in at least one other zone are positioned and electrically interconnected so as to apply a single testing voltage to a single transformer and provide a single test signal from each of the transformers which indicates the electrical properties thereof under a predetermined test condition.

7. Apparatus as set forth in claim 6 in which the fixed conductors in at least one other zone are positioned and electrically interconnected so as to apply a series of testing voltages to a single transformer and provide a series of corresponding test signals from each of the transformers which indicate the ability of the transformer to withstand each of said series of applied testing voltages.

8. Apparatus as set forth in claim 7 in which one of said zones constitutes a sound level test zone and is enclosed in a substantially soundproof tunnel through which the transformers and trolleys travel.

References Cited in the file of this patent

UNITED STATES PATENTS

| | | |
|---|---|---|
| 2,007,201 | Kilpatrick | July 9, 1935 |
| 2,278,697 | Gould | Apr. 7, 1942 |
| 2,396,991 | Elkin | Mar. 19, 1946 |
| 2,714,957 | Tapper | Aug. 9, 1955 |
| 2,744,236 | Scarborough | May 1, 1956 |